United States Patent [19]

Fujii et al.

[11] Patent Number: 5,552,101
[45] Date of Patent: Sep. 3, 1996

[54] METHOD FOR MANUFACTURING PLASTIC CASE

[75] Inventors: Tatsuo Fujii; Kimio Tanaka, both of Saku, Japan

[73] Assignee: TDK Corporation, Tokyo, Japan

[21] Appl. No.: 453,308

[22] Filed: May 30, 1995

Related U.S. Application Data

[63] Continuation-in-part of Ser. No. 86,261, Jul. 1, 1993, abandoned.

[30] Foreign Application Priority Data

Jul. 4, 1992 [JP] Japan ................................. 4-200292

[51] Int. Cl.⁶ .......................... B29C 43/24; B29C 43/46; B65D 85/575
[52] U.S. Cl. .................... 264/163; 206/387.100; 264/145; 264/160; 264/175; 264/280; 425/291; 425/294; 425/296; 425/301; 425/308; 425/363; 493/60; 493/230; 493/365; 493/370
[58] Field of Search .................... 425/294, 291, 425/296, 301, 298, 299, 308, 363; 264/157, 160, 163, 175, 280, 284, 293, 285, 295, 145; 206/387, 387.1; 493/60, 230, 354, 360, 364, 365, 370

[56] References Cited

U.S. PATENT DOCUMENTS

| | | | |
|---|---|---|---|
| 855,339 | 5/1907 | Razall | 493/60 |
| 1,967,726 | 7/1934 | Sherman | 425/291 |
| 2,621,622 | 12/1952 | Henchert | 493/60 |
| 2,984,161 | 5/1961 | Cook et al. | 264/175 |
| 3,314,340 | 4/1967 | Bishop | 493/354 |
| 3,716,132 | 2/1973 | Lewyckyj | 493/60 |
| 3,744,384 | 7/1973 | Jarritt et al. | 493/354 |
| 3,981,213 | 9/1976 | Lopman | 493/60 |
| 4,020,724 | 5/1977 | Quinlan | 493/60 |
| 4,105,738 | 8/1978 | Rohn | 264/163 |
| 4,340,342 | 7/1982 | Kim | 425/296 |
| 4,340,557 | 7/1982 | Gross | 264/163 |
| 4,386,926 | 6/1983 | Heller | 493/354 |
| 4,432,827 | 2/1984 | Graetz et al. | 206/387 |
| 4,911,298 | 3/1990 | Miyagawa et al. | 206/387 |
| 4,921,562 | 5/1990 | Fujii | 206/387 |
| 4,983,155 | 1/1991 | Stobb | 493/365 |

*Primary Examiner*—Jay H. Woo
*Assistant Examiner*—Joseph Leyson
*Attorney, Agent, or Firm*—Panitch Schwarze Jacobs & Nadel, P.C.

[57] ABSTRACT

A method for making plastic case blanks is disclosed. A molten plastic material is passed through a nip of a first, preforming pair of molding cylinders to form a semi-solidified sheet having a first thickness, The semi-solidified sheet is then molded to form a final sheet having a second, uniform thickness less than the first thickness and the final sheet is scored to form folding scores and cut to form a plurality of the blanks. The molding, scoring and cutting are simultaneously performed by passing the semi-solidified sheet through a nip of a second pair of cylinders. One of the second pair of cylinders has scoring means for forming the folding scores in the final sheet and cutting means for cutting the final sheet to form the plurality of the blanks and the other of the second pair of cylinders has recess means complementary to the cutting means for receiving the cutting means and effectuating the cutting.

2 Claims, 4 Drawing Sheets

F I G. 1
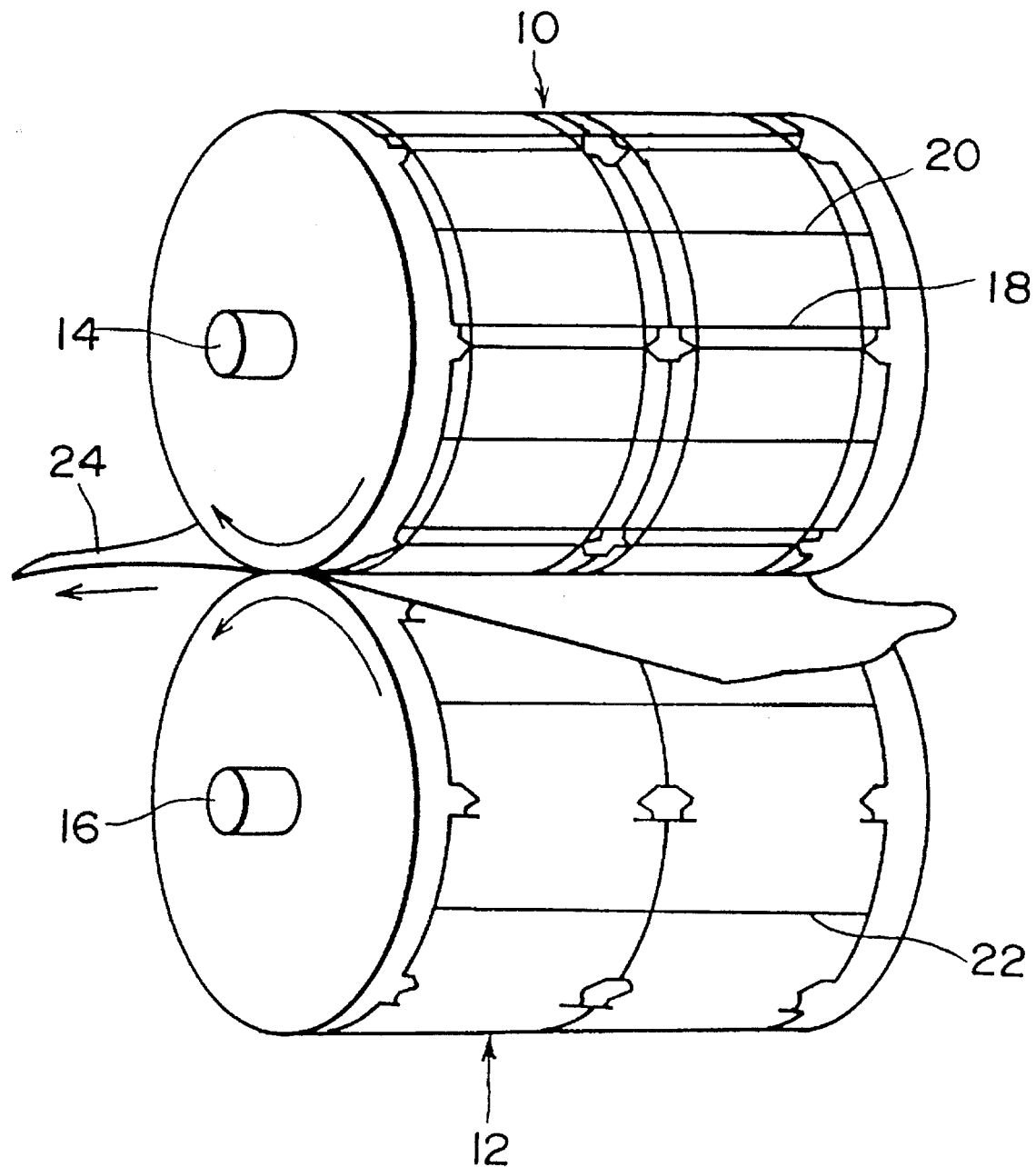

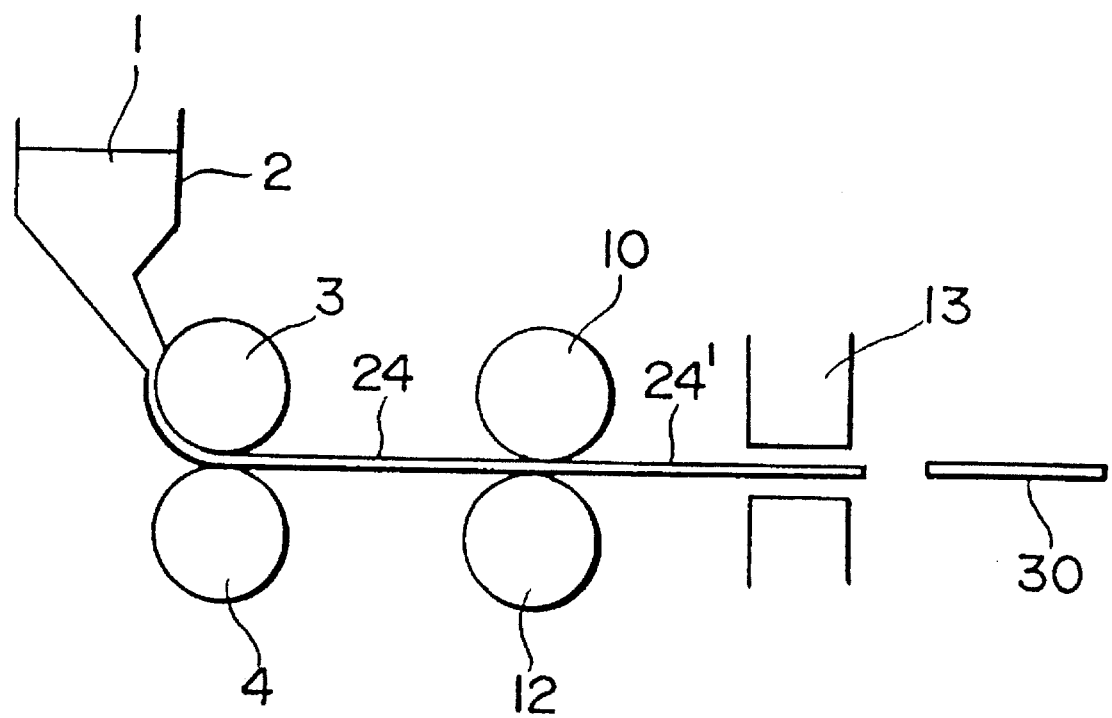

METHOD FOR MANUFACTURING PLASTIC CASE

This is a Continuation-In-Part of application ser. No. 08/086,261 filed July 1, 1993, now abandoned.

BACKGROUND OF THE INVENTION

The present invention relates to a method for manufacturing a plastic case and more particularly to a plastic case for housing a tape casette, floppy disk or other recording medium.

Heretofore, a magnetic tape cassette, a floppy disk cassette, an optical disk cassette or the like have been protected by housing it in a plastic or paper case so as to prevent dust from adhering to the surface of the recording medium in the cassette or to prevent impairment to the cassette which, otherwise, would lead to loss of memory, wrong recording or reproduction.

In such case, when, for example, a sleeve-shaped plastic case is to be formed from a blank, a sheet manufacturer produces rectangular cut sheets of a plastic material and ships the sheets to a case manufacturer. The case manufacturer, then, prints a plurality of designs and other necessary indications in some areas on one surface of the sheet corresponding to respective blanks to be cut out of the sheet. Next, the sheet is placed on an anvil plate of one of a pair of cutting dies and is cut with the other die having a cutting blade into a plurality of blanks of the same size at a time. During this process, the outer contour of each blank having a contour of an unfolded plastic case is cut along the outer ontour and separated from the sheet. The resulting blanks are each placed on an anvil plate of one of scoring dies and scored by hot press using a scoring blade of the other die while heating the blade and the anvil plate to form necessary scores or grooves for folding the blank into a case. Each of the resulting scored blanks is put in a case-forming machine in which the blank is folded up and welded together at predetermined locations of superposed portions, thereby obtaining a plastic case.

However, with the plastic case manufacturer, although a number of blanks can be cut out from a large sheet, it is not easy to perform the subsequent scoring of the blanks in the same continuous production line because the scoring of blanks one after another demands a burden in time and labor, resulting in inefficiency and high cost of the product. The present applicants proposed in Japanese Patent Application No. 4-78567 a process in which a starting molten plastic material is molded by passing the material through a nip between a pair of cylinders which simultaneously form a sheet and score folding grooves on the sheet corresponding to a plurality of blanks. The resulting sheets are shipped to a case manufacturer where each of the sheets are cut into a plurality of blanks at one time.

However, this is still cumbersome because the sheet manufacturer must ship sheets having folding scores to a case manufacturer who, in turn, cuts the blanks with cutting dies to obtain finished cases. Accordingly, plural steps still remain and the cost is not sufficiently saved. Further, the residue of the sheet must be sent back to the sheet manufacturer after the blanks are cut off from the sheets for recycling purpose. It is not rare that the residue is discarded as a trash from the economical standpoint. In addition, the dimensional precision of the products is not very high because the precise registration of the contour of the blank of the sheet with the cutting dies is not easy to establish.

The present invention aims at providing a method for providing a plastic case for recording medium or the like with high efficiency and precision at a low cost.

MEANS TO SOLVE THE PROBLEMS

According to the present invention, the above-described objects are achieved by a method for making a plastic case, including steps of supplying a molten plastic material, passing the plastic material through a nip of a pair of molding cylinders to mold the plastic material into a plastic sheet of a predetermined uniform thickness, cutting the plastic sheet into a plurality of blanks, scoring the blanks to form folding scores and folding the blanks into cases, characterized in that the molding, the scoring for forming folding scores or grooves on said sheet and the cutting into the blanks are simultaneously effected by means of said cylinders.

In such method, one of the cylinders is provided with scoring blade means for forming the scores and and cutting blade means for cutting outer periphery of the blanks, and the other cylinder is provided with recess means complementary to the cutting blade means.

Preferably, such cutting blade means may include discontinuous portion or portions to leave at least one weak joining portion between each of said blanks and remaining portion of said plastic sheet, so that the blanks are not separated until it becomes necessary to do so.

SUMMARY OF THE INVENTION

By simultaneously molding or forming of the plastic sheet, forming of the folding scores on the sheet and cutting of the sheet into a number of blanks, the blanks can be obtained by a single step process from a molten plastic material. This leads to further advantages of easy and precise registration of the folding scores and the contours of the blanks with the cutting blades, so that the dimensional precision is enhanced. Moreover, there is no need of transportation of the sheet to another factory for cutting out the blanks from the molded and scored plastic sheets, and the residual portions of the sheets are easily recycled.

BRIEF DESCRIPTION OF THE DRAWINGS

Fig. 1 is a perspective view of cylinders for producing blanks for cases for video tape casettes according to the present invention;

FIG. 6 is a schematic view of an example of process for producing blanks from a molten plastic material.

DESCRIPTION OF THE PREFERRED EMBODIMENTS

Figure 2:
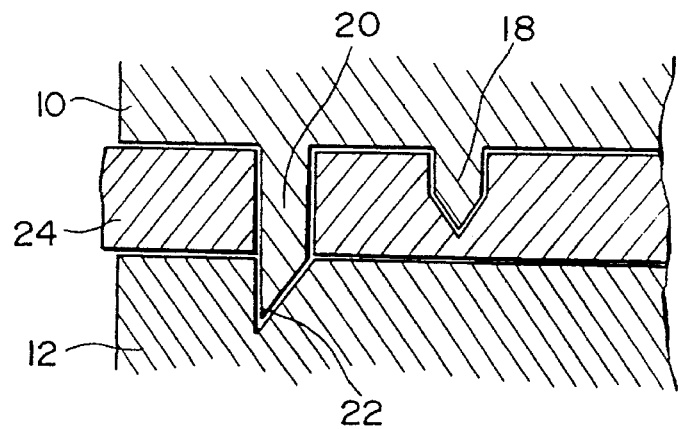
FIG. 2 is a cross sectional view showing the mating condition of the cutting blade and the scoring blade of the cylinders into the sheet.

A preferred embodiment of the present invention will now be explained in detail by making reference to the accompanying drawings.

FIG. 6 shows a schematic view of the method according to the present invention. A molten plastic material 1 such as polypropylene is supplied from a raw material container 2 to a pair of cylinders 3 and 4 where the molten plastic material 1 is squeezed and molded into a semi-solidified sheet 24 having a thickness slightly larger than the final sheet 24'. The sheet 24 is then passed through the nip of a pair of press-molding cylinders 10, 12 according to the present invention. The cylinders 10 and 12 carry out molding, scoring and cutting operations simultaneously. In a subsequent step 13, blanks 30 are separated from the molded, scored and cut sheet 28' and conveyed to another step or factory for folding up the blanks into finished cases.

FIG. 1 illustrates a pair of cylinders for production of sleeve-shaped plastic cases for video tape casettes. In this figure, 10 is a surface cylinder for molding the surface of the cases and 12 is a back cylinder for molding the back surface of the cases. 14 and 16 are shafts of the cylinders. Across the entire surface of the surface cylinder 10 extends scoring blades 18 and cutting blades 20 corresponding respectively to folding scores and outer contours of a plurality of blanks (twelve blanks in parallel two raws in this embodiment). The scoring blades 18 project by a shorter distance and the cutting blades 20 project by a larger distance from the surface ot the cylinder and the latter has a knife edge on one side of the blades as shown. Across the entire surface of the back cylinder 12 extend recesses or grooves 22 complementary to the cutting blades 20. The lengths of the cylinders 10 and 12 are 700 mm to 1200 mm, for example.

Using these cylinders 10, 12, a uniform flat sheet 24' of 400 μm to 700 μ thick is formed from the semi-solidified sheet 24. By performing molding operation by receiving the semi-solidified sheet 24 by the back cylinder 12 rotating in the direction as indicated by an arrow while pressing the surface cylinder 10 to the back cylinder 12 to continuously form a final sheet 24', formation of folding scores on the sheet 24' with scoring blades 18 as well as cutting of the sheet 24'0 into respective blanks 30 with scoring blades 20 are simultaneously performed.

Figure 3:
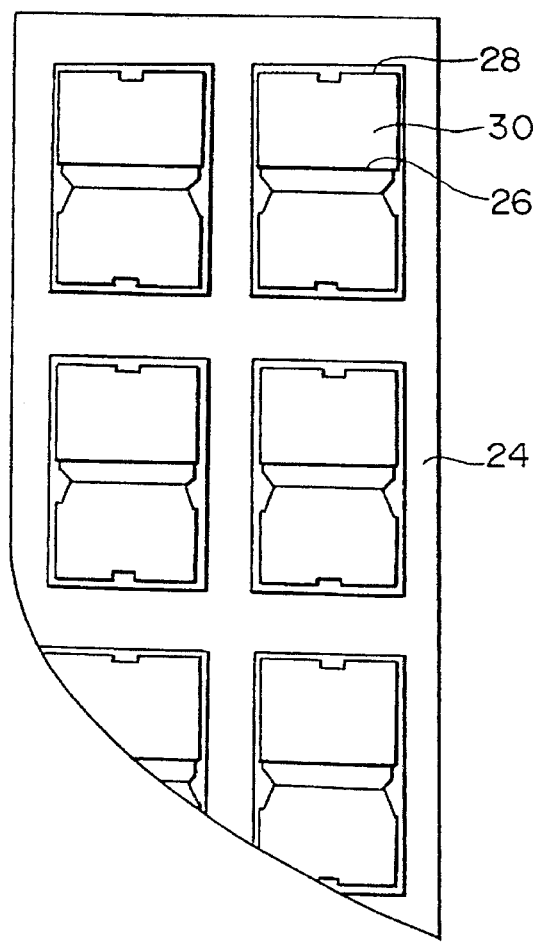
FIG. 3 is a plane view of the sheet cut into blanks.

Folding scores or grooves 26 are thusly formed with the scoring blades 18 and blanks 30 cut out of the sheet 24' along the outer contours 28 with the cutting blades 20 as shown in FIG. 3 are continuously obtained in pairs. These blanks 30 are placed on a pallet for conveying them to a subsequent step. In order to prevent them from separating from each other, it is preferred to leave at least one weak joint between the blanks 30 and the remainder of the sheet 24' during the molding, scoring and cutting operation. The plastic material may include polyesters, polycarbonate, polyvinyl chloride and other known polymers.

The simultaneous molding of the sheet 24, formation of folding scores 26 on the blanks 30 and cutting along the contours of corresponding to the outer periphery of the blanks 30 make it easy to precisely register the positions of the scores 26 with the cut periphery of each blanks 30 to have blanks of high precision. Moreover, it is no longer required to transport back the waste residues of the sheet from the case manufacturer to the sheet manufacturer and the sheet manufacturer can easily reuse the residues of the sheets.

Figure 4:
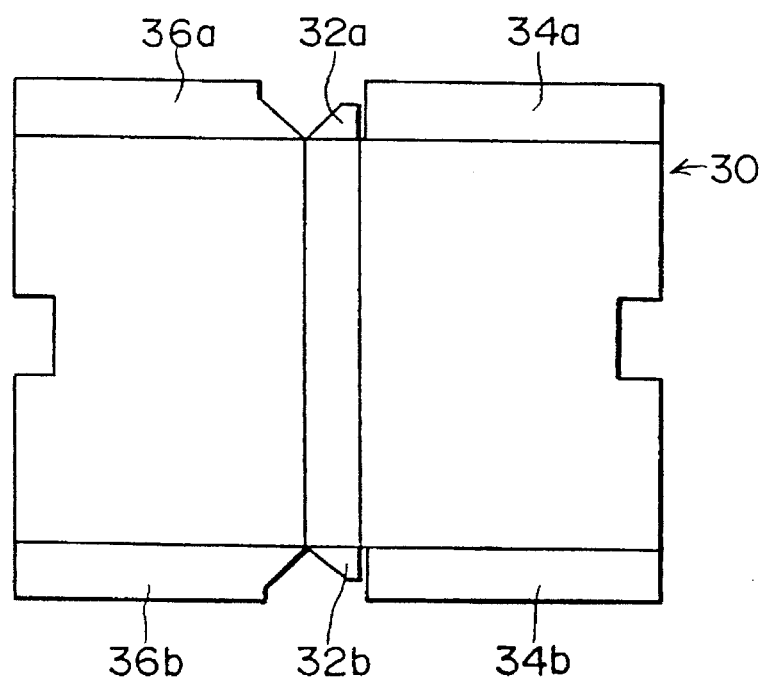
FIG. 4 is a plane view showing the details of the blank.
Figure 5:
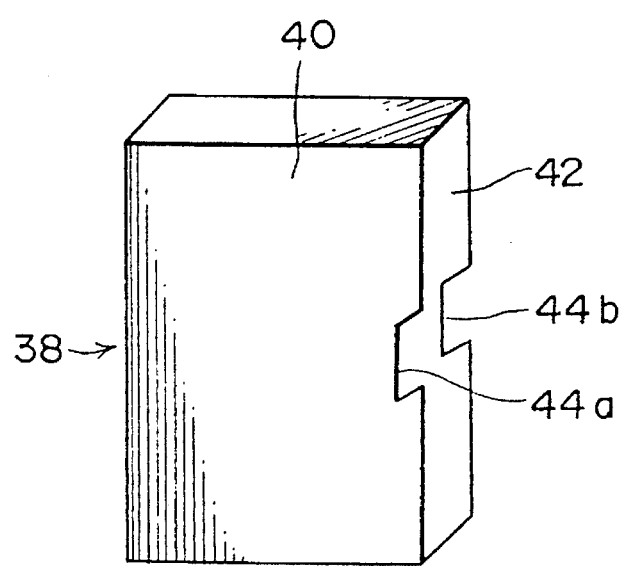
FIG. 5 is a perspective view of the blank formed into a sleeve-shaped plastic case for video tape casette.

FIG. 4 shows one of the blanks 30 which is an unfolded plane view of the plastic case according to the present invention. This blank 30 has ear flaps 32a, 32b, outer flaps 34a, 34b, inner flaps 36a, 36b. The blanks 30 are charged into a folding machine and these flaps are folded up to appropriately superpose these flaps and welded together in the superposed areas to form lateral panels of the case. The completed sleeve type case 38 for a tape cassette is shown in FIG. 5, in which the case includes a face panel 40, back panel 42 and cut-out 44a and 44b for fingers.

From the foregoing, according to the present invention, a molten plastic material is molded into a sheet by means of a pair of molding cylinders, which simultaneously perform scoring of the sheet to form folding scores or grooves and cutting of the sheet along contours corresponding to the outer peripheries of a plurality of blanks to be formed, whereby the formation of the scores and the cutting of the sheet into blanks are precisely harmonized in position and thus the precision of the case is improved. Because of the fact that the blanks are cut in one step, there is no need of transporting the sheet to a case manufacturer and thus it is easy to reuse the residues of the sheets and the process efficiency is improved and the production cost is reduced.

It should be noted that the present invention may have a number of modifications without departing from the spirits of the present invention and within the scope of the accompanying claims.

We claim:

1. A method for making plastic case blanks comprising the steps of:

supplying a molten plastic material;

passing the molten plastic material through a nip of a first, preforming pair of cylinders to form a semi-solidified sheet having a first thickness;

simultaneously molding the semi-solidified sheet into a final sheet having a second, uniform thickness less than the first thickness, scoring the final sheet to form folding scores, and cutting the final sheet to form a plurality of the blanks, the step of simultaneously molding, scoring and cutting being performed by passing the semi-solidified sheet through a nip of a second pair of cylinders, one of the second pair of cylinders having scoring means for forming the folding scores in the final sheet and cutting means for cutting the final sheet to form the plurality of the blanks and the other of the second pair of cylinders having recess means complementary to the cutting means for receiving the cutting means and effectuating the cutting.

2. The method of claim 1 wherein the cutting means includes a blade having a discontinuous portion for imprinting a relatively weak joining portion between each blank and a portion of the final sheet adjacent the blank, and wherein the step of simultaneously molding, scoring and cutting further includes forming a relatively weak joining portion between each blank and a portion of the final sheet adjacent the blank.

\* \* \* \* \*